Patented Feb. 10, 1948

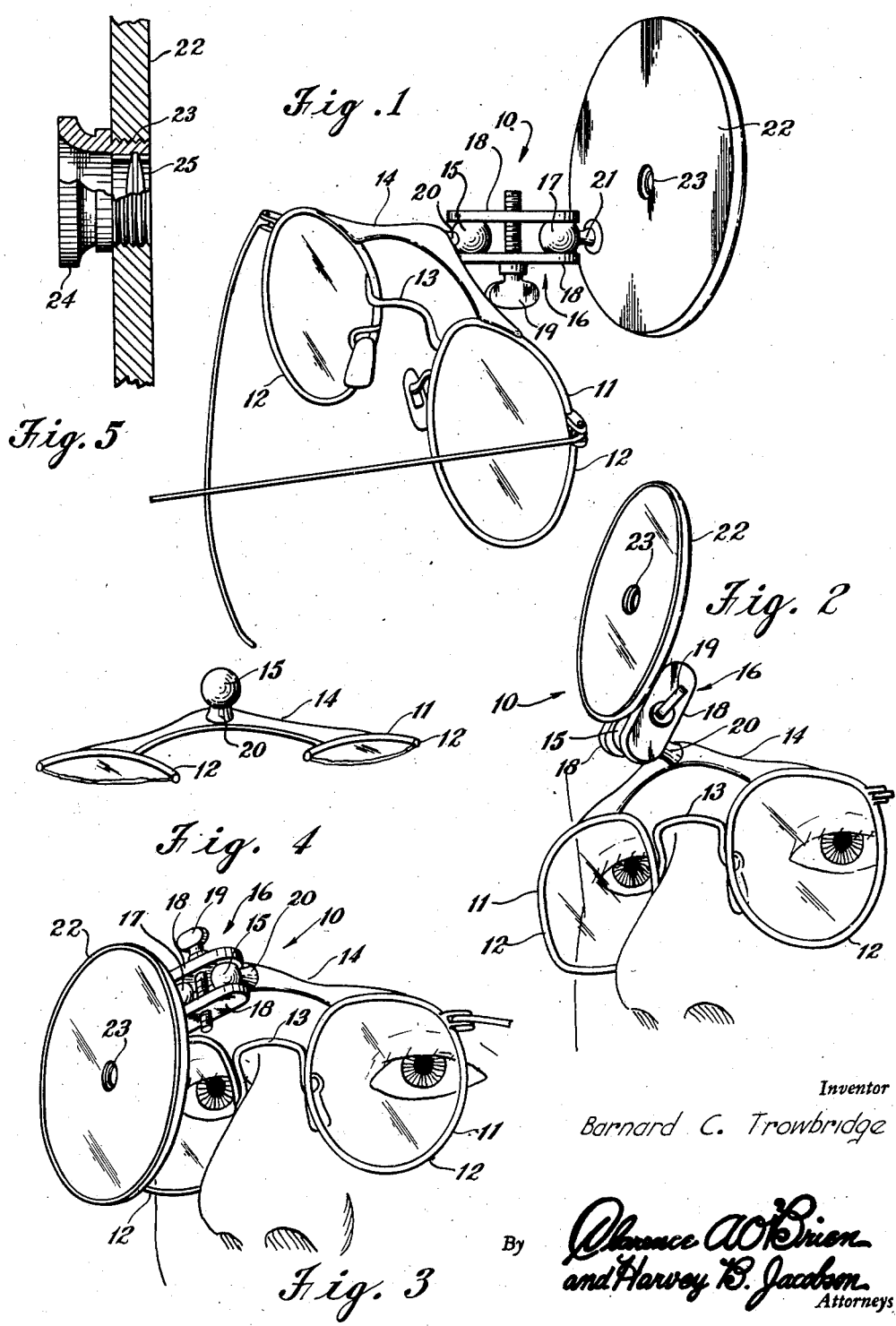

2,435,728

UNITED STATES PATENT OFFICE 2,435,728

MIRROR ATTACHMENT FOR EYEGLASSES

Barnard C. Trowbridge, Kansas City, Mo.

Application August 7, 1946, Serial No. 689,056

2 Claims. (Cl. 128—21)

This invention relates to new and useful improvements and structural refinements in mirror attachments for eyeglasses and the principal object of the invention is to provide a device of the character herein described, such as may be conveniently and effectively employed by physicians, surgeons, opticians, and others who customarily employ surgical mirrors of conventional design in their respective professions.

A further object of the invention is to provide a mirror attachment which is particularly adapted for use by persons accustomed to wearing eyeglasses.

Another object of the invention is to provide a mirror attachment which is readily adjustable so as to facilitate proper positioning thereof in readiness for use, and to permit the same to be quickly and conveniently offset, when not required.

An additional object of the invention is to provide a mirror attachment which embodies in its construction a magnifying lens, such as may be readily employed when so desired.

A still further object of the invention is to provide a mirror attachment which is simple in construction and operation, and which does not, in any way, interfere with the normal use of the eyeglasses.

With the above more important objects in view, and such other objects as may become apparent as this specification proceeds, the invention consists essentially of the arrangement and construction of parts as illustrated in the accompanying drawings, in which—

Figure 1 is a perspective view of the invention,

Figure 2 is a further perspective view thereof,

Figure 3 is an additional perspective view of the subject shown in Figure 2, but showing the mirror attachment in readiness for use, Figure 4 is a fragmentary perspective view of the attachment per se, and Figure 5 is a cross-sectional view of the mirror, showing the magnifying lens and adapter associated therewith.

Like characters of reference are used to designate like parts in the specification and throughout the several views.

Referring now to the accompanying drawings in detail, the invention consists of a mirror attachment designated generally by the reference character 10, the same being adapted for use in association with a pair of eyeglasses 11 of more-or-less conventional design.

The eyeglasses 11 include the usual frame or rim 12 and the nose-piece 13, as will be clearly understood. The essence of the invention resides in the provision of an upwardly arcuated bridge 14 secured at the extremities thereof to the rim 12, said bridge spanning the nose-piece 13 and carrying at the mid-portion thereof a ball 15 of a flexible coupling designated generally by the reference character 16.

This coupling also includes a further ball 17 and a pair of links 18, the latter being disposed in a spaced, parallel relationship and connected together by a clamp assuming the form of a wing bolt 19. The end-portions of the links 18 are formed with suitable depressions constituting sockets, in which the balls 15 and 17 may be adjustably positioned.

It should be understood that the aforementioned ball 15 is formed with a shank 20 to facilitate the connection thereof to the bridge 14, while the ball 17 is provided with a similar shank 21, whereby it may be secured to a suitable, substantially circular mirror 22.

It will be noted that the ball 17 is secured to the mirror in an eccentric manner, and that the mirror is provided at the center thereof with a screw threaded bore forming the sight opening or aperture 23.

A screw threaded adapter 24, configurated substantially as shown, is removably receivable in the opening 23, the adapter 24 being provided with a magnifying lens 25.

When the invention is placed in use, the mirror 22 may be readily swung into its operative position as shown in Figure 3, by simply adjusting the balls 15, 17 in their respective sockets provided by the links 18. When the mirror is not required, it may be readily swung out of the way, as illustrated in the accompanying Figure 2.

The magnifying lens 25, together with the associated adapter 24, may not be required for normal work, but when detailed operations or examinations are undertaken, the additional advantages afforded by the magnifying lense are readily provided by simply engaging the adapter 24 with the bore 23, as indicated in Figure 5.

It is believed that the advantages and use of the invention will be clearly apparent to those skilled in the art to which the invention pertains and accordingly, further description thereof at this point is considered unnecessary.

While in the foregoing there has been shown and described the preferred embodiment of this invention it is to be understood that minor changes in the details of construction, combination and arrangement of parts may be resorted

What I claim as my invention is:

1. A mirror attachment for eyeglasses, comprising in combination, a bridge secured to the rims of said glasses and spanning the nosepiece, a flexible coupling including a pair of spaced parallel links forming a socket at each end thereof, clamping means for drawing said links together, and a ball adjustably positioned in each of said sockets, one of said balls being secured to the mid-portion of said bridge, a substantially circular mirror secured to the remaining of said balls, said mirror being formed substantially at the center thereof with a screw threaded bore constituting a sight aperture, a screw threaded adapter removably receivable in said bore, and a magnifying lens mounted in said adapter.

2. A mirror attachment for eye glasses, comprising in combination, a bridge secured to the rims of said glasses and spanning the nose piece, a flexible coupling including a pair of spaced parallel links forming a socket at each end thereof, clamping means for drawing said links together, a ball adjustably positioned in each of said sockets, one of said balls being secured to the mid-portion of said bridge, and a substantially circular mirror secured to the remaining of said balls, said mirror being formed substantially at the center thereof with a sight aperture.

BARNARD C. TROWBRIDGE.

REFERENCES CITED

The following references are of record in the file of this patent:

FOREIGN PATENTS

| Number | Country | Date |
| --- | --- | --- |
| 422,691 | Great Britain | Jan. 16, 1935 |